Figure 1:
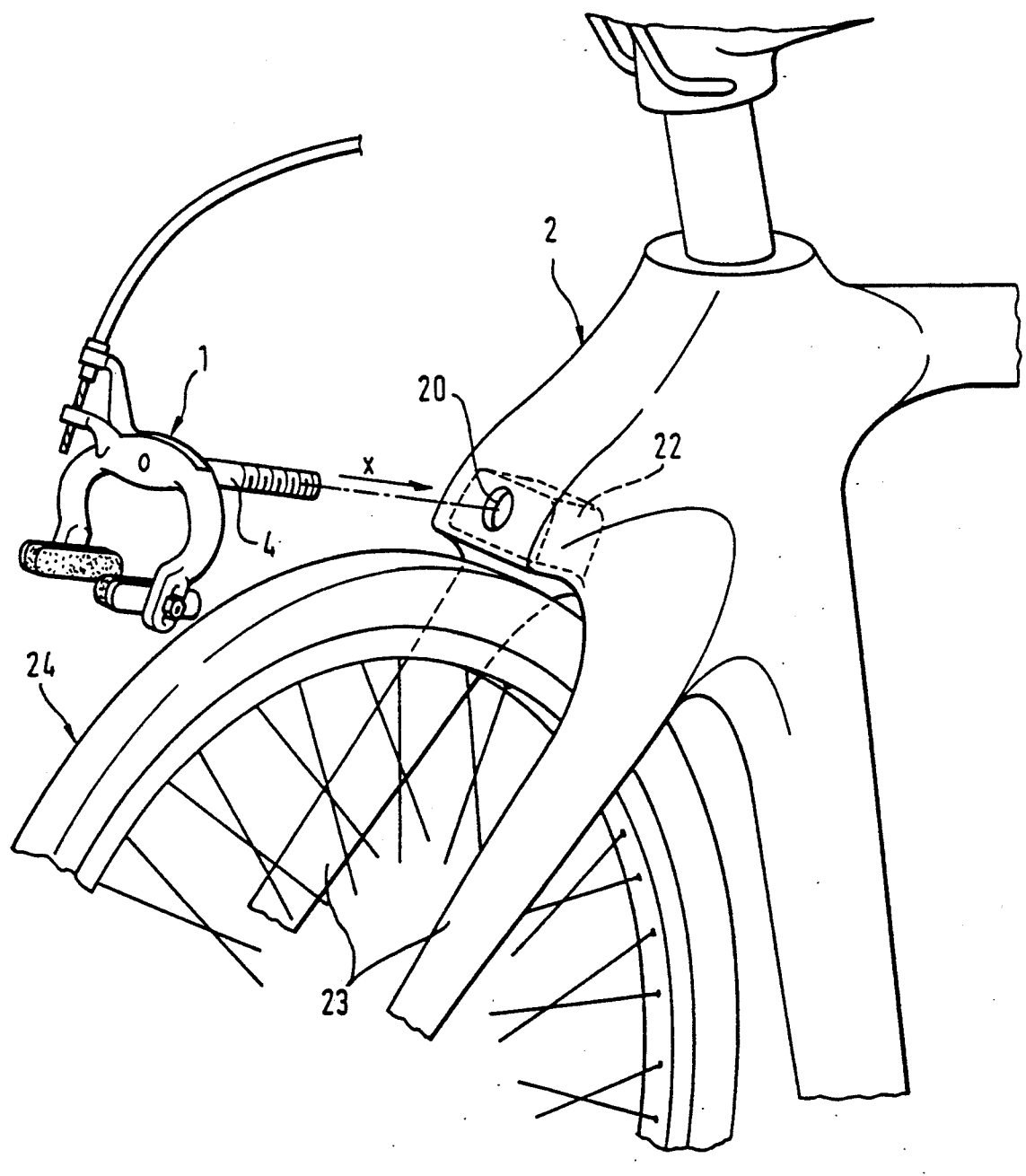

United States Patent [19]
Couturet et al.

[11] Patent Number: 5,190,308
[45] Date of Patent: Mar. 2, 1993

[54] APPARATUS FOR SECURING ACTIVE AND/OR PASSIVE ELEMENT TO THE WALL OF COMPOSITE COMPONENTS

[75] Inventors: Jean-Pierre Couturet; Jean-Claude Chretien, both of Nevers, France; Joris van Raemdonck, Bazel, Belgium

[73] Assignee: Look S.A., Nevers cedex, France

[21] Appl. No.: 714,163

[22] Filed: Jun. 11, 1991

[30] Foreign Application Priority Data

Jun. 13, 1990 [DE] Fed. Rep. of Germany ....... 4018957

[51] Int. Cl.[5] .............................................. B62K 19/38
[52] U.S. Cl. .............................. 280/281.1; 280/288.4; 403/21
[58] Field of Search .......................... 280/281.1, 288.4; 403/21, 22, 200; 188/24.14, 24.21, 24.22

[56] References Cited

U.S. PATENT DOCUMENTS

| | | | |
|---|---|---|---|
| 3,053,357 | 9/1962 | Stanger | 403/21 |
| 5,005,675 | 4/1991 | Pletscher | 188/24.14 |
| 5,071,299 | 12/1991 | Sekine et al. | 403/200 X |

FOREIGN PATENT DOCUMENTS 2416371 10/1979 France ................................... 403/21

Primary Examiner—Margaret A. Focarino
Assistant Examiner—Carla Mattix
Attorney, Agent, or Firm—Townsend and Townsend

[57] ABSTRACT

An apparatus for securing elements to the wall of composite components has a holder which passes through an aperture of the composite component. The holder consists of a coupling part which is disposed on the side of the composite component to which access is difficult and also of an operating part which is disposed at the readily accessible side of the composite component. The actuating part and the coupling part are engagable with one another for the application of a rotary movement from the actuating part to the coupling part. The coupling part is couplable with a coupling counterpart of the element to be mounted which passes through the actuating part through mutual rotation and axial clamping of the coupling part, the wall, the actuating part and the element.

12 Claims, 4 Drawing Sheets

APPARATUS FOR SECURING ACTIVE AND/OR PASSIVE ELEMENT TO THE WALL OF COMPOSITE COMPONENTS

The invention relates to an apparatus for securing active and/or passive elements to the wall of composite components, in particular to vehicles, such as bicycles with composite frames.

With composite components, such as for example composite or monoblock frames of bicycles, the problem exists that no holes can be bored for the mounting of the elements which are to be secured to these components. These composite components consist of fabric and fibre plys and also synthetic material, in particular synthetic resin. These composite components, which are laid out for high strength at low weight and low material usage, would be so damaged by the subsequent boring of mounting holes in their structure that cracks could start at these bored mounting holes and could rapidly lead to the destruction of the entire component. Accordingly mounting holes can only be provided by the manufacturer of the composite component.

Such mounting apertures are frequently not straightforwardly accessible from both sides so that for example the screwing on of the elements to be mounted in the customary manner is extremely difficult, if not entirely impossible, since a tool for holding, for example, a securing nut, can frequently not be mounted at the position for location of the mounting nut to which access is difficult. This problem exists in particular with narrow aerodynamically shaped bicycle frames to which for example the brakes have to be screwed.

It is thus the object of the present invention to provide an apparatus of the initially named kind which permits the mounting of active or passive elements to composite components without bringing about weakening of these components, and which also permits the attachment of such elements to locations to which access for customary mounting devices is difficult.

This object is satisfied in accordance with the invention in that a holder is provided on the composite component and engages through an aperture in the wall of the composite component and has a coupling part disposed at the one side of the composite component to which access is difficult, and also an actuation part which is disposed at the other side of the composite component which can be brought into engagement with the coupling part for the application of a turning movement to the coupling part; and in that the coupling part can be coupled with a coupling counterpiece of the element which passes through the actuating part with mutual rotation and axial clamping of the coupling part, the wall, the actuating part and the element.

Through the provision of a holder of this kind the coupling part to which access is difficult can be turned in simple manner by means of the actuating part located at the readily accessible side, so that a rotationally and axially fixed connection arises between the element to be mounted and the composite component, with the actuating part becoming a part of the connection.

A particularly advantageous layout of the coupling part and the actuating part is set forth in claim 2. The coupling elements provided on a cylindrical projection, which can in particular be formed in accordance with claim 3 as axially extending claws or dogs, can in this embodiment not only rotate without problem in the aperture of the wall of the composite component, but rather the cylindrical projections of both parts simultaneously ensures a good radial and axial guidance of both parts in the aperture of the wall of the composite component.

Figure 4:
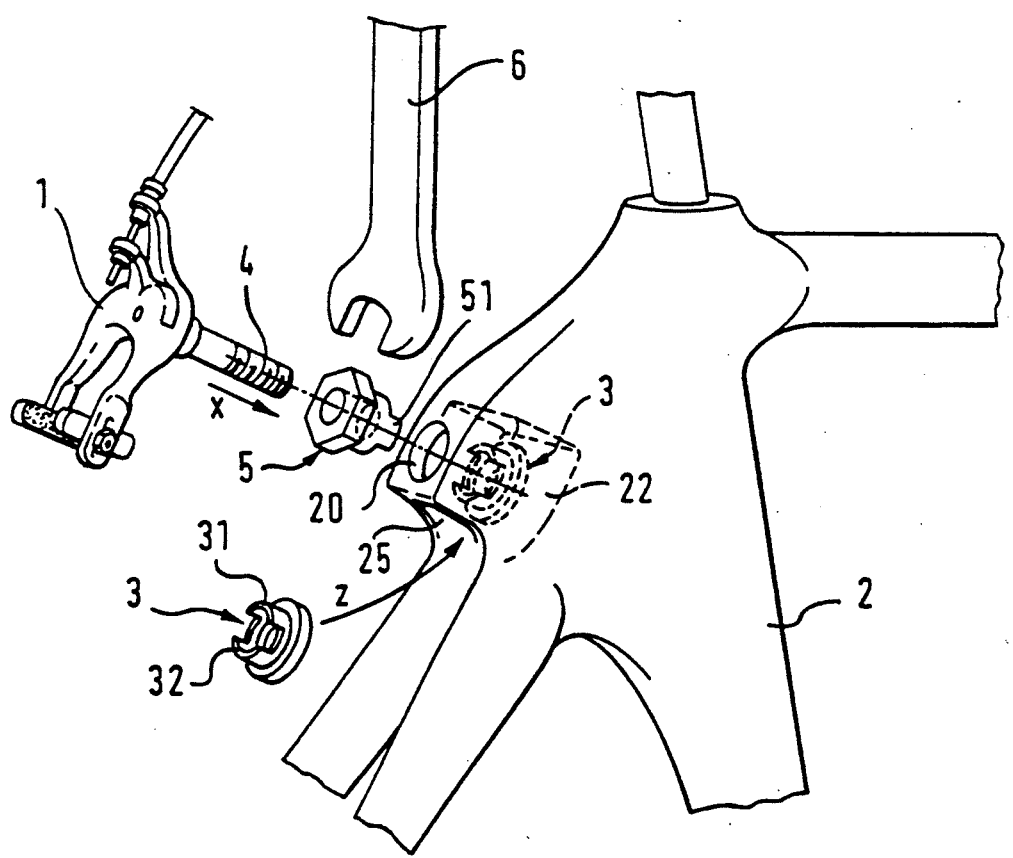

In the element of FIG. 4 it is advantageous that the coupling part and the actuating part can be axially connected together after insertion into the aperture, for example by clipping them together in the region of the coupling elements. In this way the holder can already be non-loosably inserted into the aperture of the wall without the installation of the element which is to be mounted having to take place at the same time. It is however also conceivable that only the coupling part is pressed into the aperture from the side to which access is difficult and is held there via a frictional force or by means of axially acting and radially freely moving latch elements. The placement of the actuating part takes place in this case only on attachment of the element to be mounted.

Particularly advantageous embodiments of the coupling connection between the coupling part and the element to be mounted are set forth in claims 5 and 6. Both the threaded connection of claim 5 and also the bayonet connection of claim 6 provide a reliable and durable mounting of the element on the composite component, with the mounting in accordance with claim 6 being capable of being effected particularly quickly.

The provision of special contact surfaces in accordance with claim 7 at the joint surfaces of the axially clamped parts not only provides a high friction surface which is particularly effective against automatic release but also ensures a large support area of the individual parts against one another which is in particular advantageous for the support of the forces at the wall of the composite component which are to be transferred to the composite component via the element to be mounted. For increased efficiency these contact surfaces can be provided with a surface with an elevated coefficient of friction in accordance with claim 8.

In accordance with claim 9 it is adantageous to provide a force applying surface at the outer periphery of the actuating part since the lever arm for the actuation is largest there. In this way the frictions which are produced by the contact surfaces, which serve for the self-holding of the overall connection but which can hinder the rotation of the actuating device can be effectively overcome.

The embodiments of claims 10, 11 and 12 relate to advantageous forms of the force applying surface, with the embodiments of claims 11 and 12 being particularly advantageously actuatable even without tools.

Figure 2:
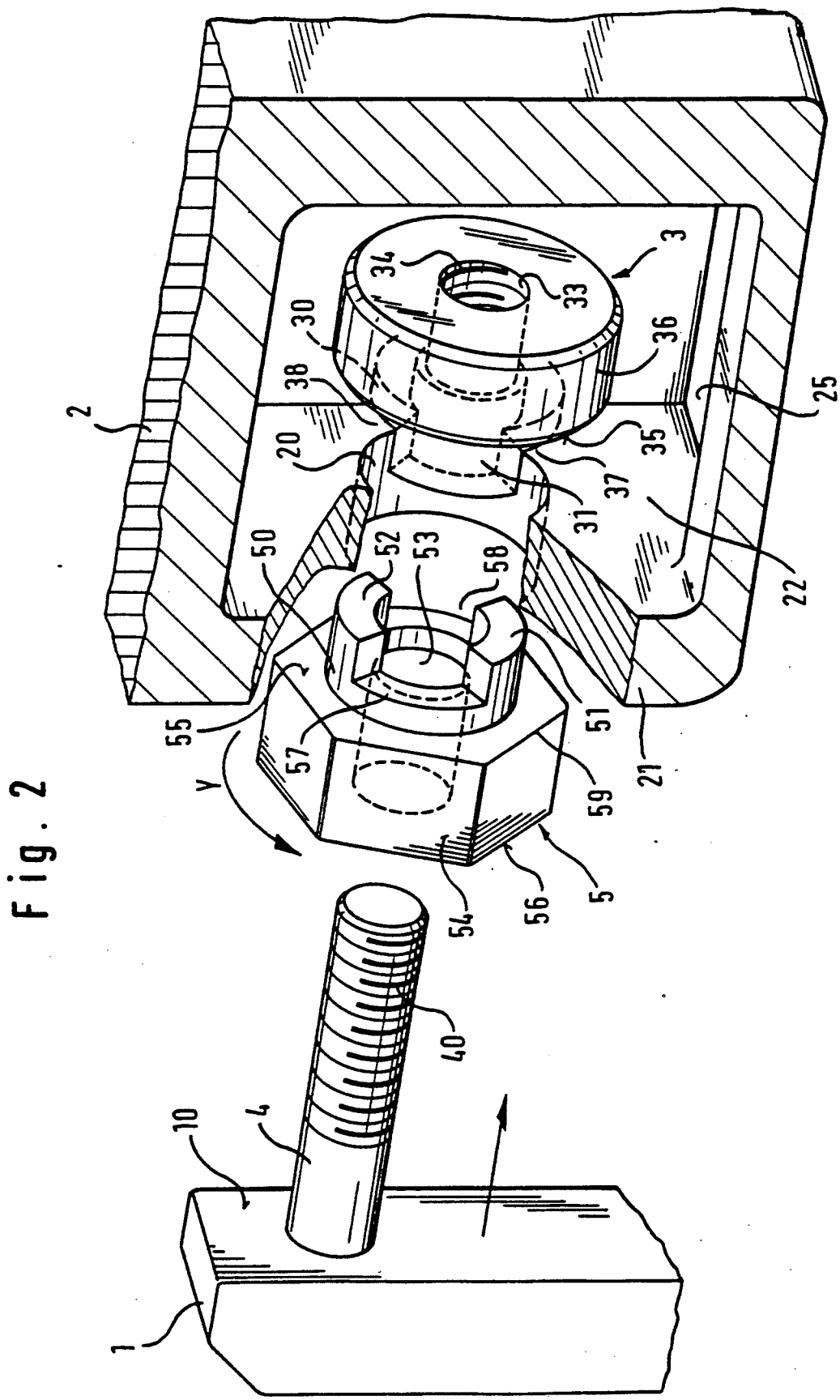
Figure 3:
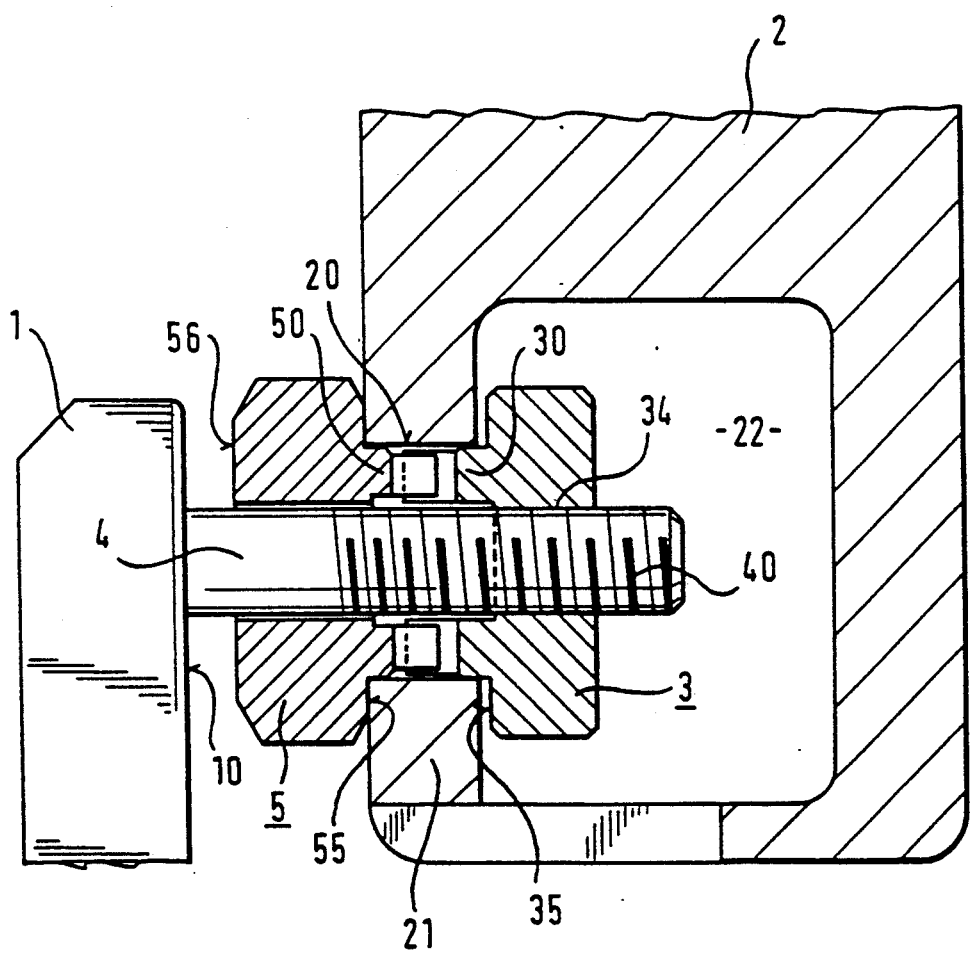

The invention will subsequently be explained in more detail with reference to the drawing in which are shown;

FIG. 1 a part of a monoblock bicycle frame consisting of a composite material with a rearwheel being indicated, FIG. 2 a perspective view of an apparatus in accordance with the invention, FIG. 3 a sectional view of the apparatus and FIG. 4 an installation sketch.

In FIG. 1 is shown a perspective view of a section of a bicycle frame (composite component) 2 manufactured as a monoblock frame of composite material, a mounting aperture 20 being shown which is provided in the region of the frame attachment of the rear frame fork 24. The mounting aperture 20 opens into a hollow chamber 22 which is only accessible from below (from the rearwheel 24). Furthermore FIG. 1 shows a rim brake (element to be mounted) 1 which has a mounting bolt (coupling counterpart) 4 which is coaxially aligned with the mounting aperture 20.

The arrow X indicates that the mounting bolt 4 of the rim brake 1 is to be pushed into the aperture 20 and secured there. The access to the hollow chamber 20 shown in broken lines in the frame 2 for the insertion and fastening of a mounting nut is covered over by the rearwheel to the extent that the insertion of a tool into the hollow chamber 22 is not possible, at least not when the rearwheel is mounted.

FIG. 2 shows the hollow chamber 22 of the frame 2 manufactured as a composite component with the mounting aperture 20 and the rearwall 21, with the hollow chamber 22 being shown partly cut away.

At the inner side of the hollow chamber 22 there is shown a coupling part 3 with a cylindrical projection 30 which is insertable into the mounting aperture 20 in an essentially accurately fitting but rotatable manner. The coupling part 3 can be introduced from below through the large aperture 25 which is shown in broken lines in the hollow chamber 22 (arrow Z in FIG. 4).

Towards the center of the hollow cavity 22 a section 36 of larger diameter adjoins the cylindrical projection 30 of the coupling part 3. The transition from the cylindrical projection 30 to the section 36 of larger diameter takes place with the formation of a radially extending surface 35 of a step.

The coupling part 3 is provided with an axial bore 33 which has a thread 34. At the end of the coupling part 3 pointing towards the aperture 20 two claws 31, 32 extend starting from the cylindrical projection 30 in the axial direction, with the external periphery of the claws corresponding to that of the cylindrical projection 30.

The claws 31, 32 are formed to engage in recesses 57, 58 of complementary shape at the end of the cylindrical projection 50 of the actuating part 5 pointing towards the aperture 20.

The actuating part 5 is in this arrangement inserted from the outside into the aperture 20 with the claws 51, 52 which are formed in the same manner as on the coupling part 3 engaging into complementary recesses 37, 38 of the coupling part 3. In this way a rotationally fixed coupling of the coupling part 3 with the actuating part 5 arises.

The actuating part 5 has an axial bore 53 the diameter of which is fractionally larger than the diameter of the axial bore 33 in the coupling part 3 so that a coupling counterpart (securing bolt 4) which is equipped with a thread 40 which fits the thread 34 of the coupling part 3 and which is provided on an element (rim brake 1) which is to be mounted on the composite component (frame 2) can be freely guided by the axial bore 53.

The actuating part 5 passes, while forming a step with a radially extending countersurface 55 into an outwardly disposed section 59 of larger diameter which is of hexagonal shape at its peripheral surface 54 for engagement by a spanner 6.

The axial extent of the cylindrical projections 30 and 50 and also of the coupling claws 31, 32; 51, 52 which extend axially from them is, in the coupled state of the coupling part 3 in the actuating part 5, the same or fractionally smaller than the thickness of the wall 21 in the region of the aperture 20, so that the claws 31, 32; 51, 52 can engage sufficiently deeply into the complementary cutout 57, 58; 37, 38, however, without the end face of the respective claws 51, 52; 31, 32 contacting the base of the associated cutout 37, 38; 57, 58.

In this way it is ensured that in the coupled state both the radially extending contact surface 35 of the coupling part 3 and also the radially extending contact surface 55 of the actuating part 5 can contact the inner and outer surfaces of the wall 21 respectively.

After the coupling part 3 and the actuating part 5 have been assembled passing through the aperture 20 in the described manner the cylindrical mounting bolt 4 of the rim brake 1 provided with a thread 40 is pushed through the axial bore 53 of the actuating part 5 from the outside and guided up to the inner thread 34 in the coupling part 3. Thereafter the actuating part 5 is rotated in the direction of the arrow Y.

Actuating part 5 is rotated via a force applying surface (54). As shown in FIG. 2, force applying surface (54) is sized for sue with a tool, such as a wrench, for torquing. Alternately, force applying surface (54) can be configured with a knurled surface or as a wingnut, both of which can be torqued by hand.

Via the described coupling connection this rotary movement is transferred to the coupling part 3 so that the internal thread 34 is threaded onto the external thread 40. During this the coupling part 3 is braced with radially extending contact surface 34 against the inner side of the wall 21 and draws the securing bolt 4 with the rim brake 1 attached thereto into the hollow cavity 22 until the end face contact surface 10 of the element 1 facing the composite component 2 comes into contact with the outer contact surface 56 of the actuating part 5. A further rotary movement of the actuating part 5 in the direction of the arrow Y and also draws the inner contact surface 55 of the actuating part 5 against the outer side of the wall 21, so that any axial clearance between the coupling part 3, the wall 21, the actuating part 5 and the rim brake 1 is cancelled.

The parts which have been clamped together in this manner generates sufficient friction at the contacting contact surfaces in that further rotation of the named part relative to one another is largely prevented.

In this manner the rim brake 1 is securely fastened at the bicycle frame 2 and is secured against both axial displacement and also rotation.

Another way of connecting securing bolt (4) to coupling part (3) is with a bayonet connection. One variation of a bayonet connection, among many well known variations, includes a small protrusion at the end of securing bolt (4). The protrusion fits into a generally L-shaped groove cut into the surface having the threads in the above-described embodiment. Coupling part (3) also includes a spring for biasing into engagement with the protrusion once the protrusion is positioned within the L-shaped groove.

To secure the bayonet connection securing bolt (4) is pressed into axial bore (33) with the protrusion lined up to pass within the L-shaped groove of coupling part (3). As noted above, entry of securing bolt (4) into axial bore (33) is resisted by the spring. Once the protrusion is pressed to the bottom of the L-shaped groove, coupling part 3 is twisted so the protrusion travels along the bottom of the L-shaped groove. Once at the end of the L-shaped groove the protrusion is kept in place with the spring force.

FIG. 3 shows once again the above described connection in a state shortly prior to attainment of the final secured position of the rim brake 1. The axial clearance which is still present between the contact surface 10 of the rim brake 1 and the outer contact surface 56 of the actuating part 5, and also the axial spacing between the wall 21 and the coupling part 3 can clearly be seen. It can furthermore be seen in this sectional drawing that the spacing between the intermeshing coupling claws and the base of the associated complementary cutout is larger than the remaining gap between the coupling part 3 and the wall 21, so that with the thread 40, 34 screwed in to the maximum amount both the inner contact surface 55 of the actuating part 5 and also the contact surface 35 of the coupling part come firmly into engagement with the wall 21 and can clamp the latter between them.

Furthermore, the radial guidance of the cylindrical projections 30 and 50 within the aperture 20 can be recognized which prevents a radial movement of the holder 3, 5 inserted into the aperture 20.

FIG. 4 shows an exploded illustration of the parts of the apparatus which are to be installed together, with the position to be adapted by the coupling part 3 inside the hollow cavity to which access is difficult being shown in broken lines. The assembly of the apparatus which has already been described in connection with FIG. 2 is once again made clear with reference to this Figure, with the placement of the tool 6 on the coupling piece 5 being shown. In this manner it is particularly clear that the rim brake 1 which is to be mounted on the frame 2 is simply screwed to the frame 2 by means of the coupling piece 3 which is actuated from the outside via the outwardly disposed coupling piece 5, and its mounting bolt 4.

We claim:

1. Apparatus for the securing of an element to a wall of a composite component comprising a holder (3, 5) on the composite component (2) engaging through an aperture (20) in the wall (21) of the composite component (2) and having a coupling part (3) disposed at a first side of the composite component (2) to which access is difficult, and an actuation part (5) which is disposed at a second side of the composite component (2) which can be brought into engagement with the coupling part (3) for applying a turning movement to the coupling part (3); the coupling part (3) being adapted to be coupled with a coupling counterpiece (4) of the element (1) which passes through the actuating part (5), with mutual rotation and axial clamping of the coupling part (3), the wall (21), the actuating part (5) and the element (1).

2. Apparatus in accordance with claim 1, characterized in the the coupling part has a cylindrical projection (30) which can be inserted into the aperture (20) and is provided with first coupling elements (31, 32); and in that the actuating part (5) has a cylindrical projection (50) which can be inserted into the aperture (20) and is provided with second coupling elements (51, 52) which matingly engage the first coupling elements of the coupling part (3).

3. Apparatus in accordance with claim 2, characterized in that the first and second coupling elements (31, 32; 51, 52) are formed by axially extending claws.

4. Apparatus in accordance with claim 1, characterized in that the coupling part (3) and the actuating part (5) are axially connectable to one another.

5. Apparatus in accordance with claim 1, characterized in that the coupling part (3) has an axial bore (33) provided with a thread (34), and in that the actuating part (5) has an axial bore (53) of a larger diameter than that of the coupling part (3), and in that the coupling counterpart (4) is provided with a thread (40) matched to the thread (34) in the coupling part (3).

6. Apparatus in accordance with claim 1, characterized in that the actuating part (5) and the coupling part (3) each have an axial bore (53, 33); in that the coupling counterpiece (4) is of cylindrical shape and can pass through the axial bores (53, 33) in the actuating part (5) and in the coupling part (3); and in that the coupling part (3) and the coupling counterpart (4) are formed as an interengaging bayonet connection.

7. Apparatus in accordance with claim 1, characterized in that the coupling part (3) and the actuating part (5) are each formed at their sides facing the wall (21) with first and second contact surfaces respectively (35, 55) for contact with the wall (21); and the actuating part (5) has at its end face remote from the wall (21) a third contact surface (56) for contact with the element (1).

8. Apparatus in accordance with claim 7, characterized in that the contact surfaces (35, 55; 56; 10) and the wall (21) have an increased coefficient of friction in the contact region.

9. Apparatus in accordance with claim 1, characterized in that the actuating part is provided at its outer periphery disposed axially outside of the aperture (20) with a surface (54) for the application of a force.

10. Apparatus in accordance with claim 9, characterized in that the force applying surface (54) is formed as a multi-sided body for the application of a tool.

11. Apparatus in accordance with claim 9, characterized in that the force applying surface (54) is formed as a knurled surface.

12. Apparatus in accordance with claim 9, characterized in that the force applying surface (54) is formed as a wingnut.

* * * * *